K. SMITH.
FIFTH WHEEL CONSTRUCTION.
APPLICATION FILED AUG. 3, 1914.
1,168,756.
Patented Jan. 18, 1916.
2 SHEETS—SHEET 2.
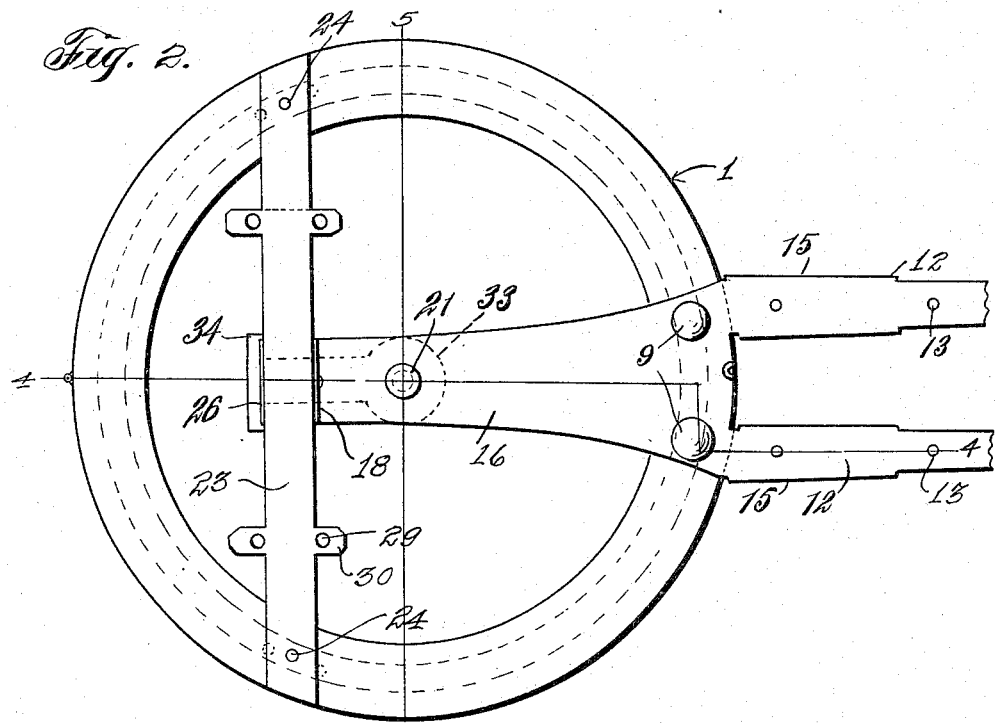
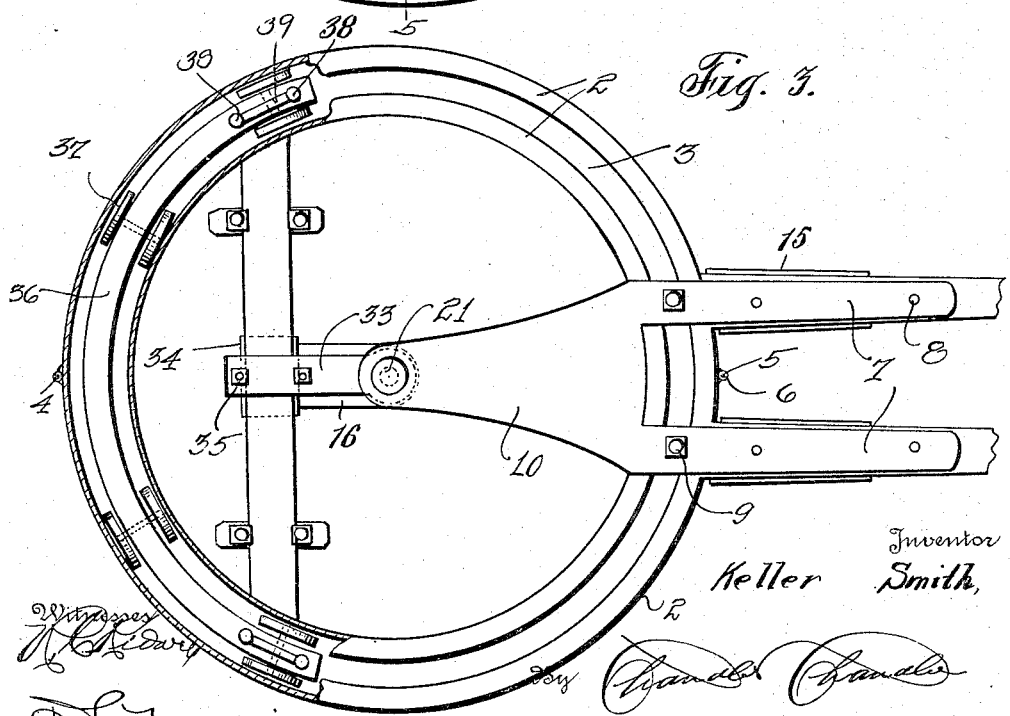
Inventor
Keller Smith,

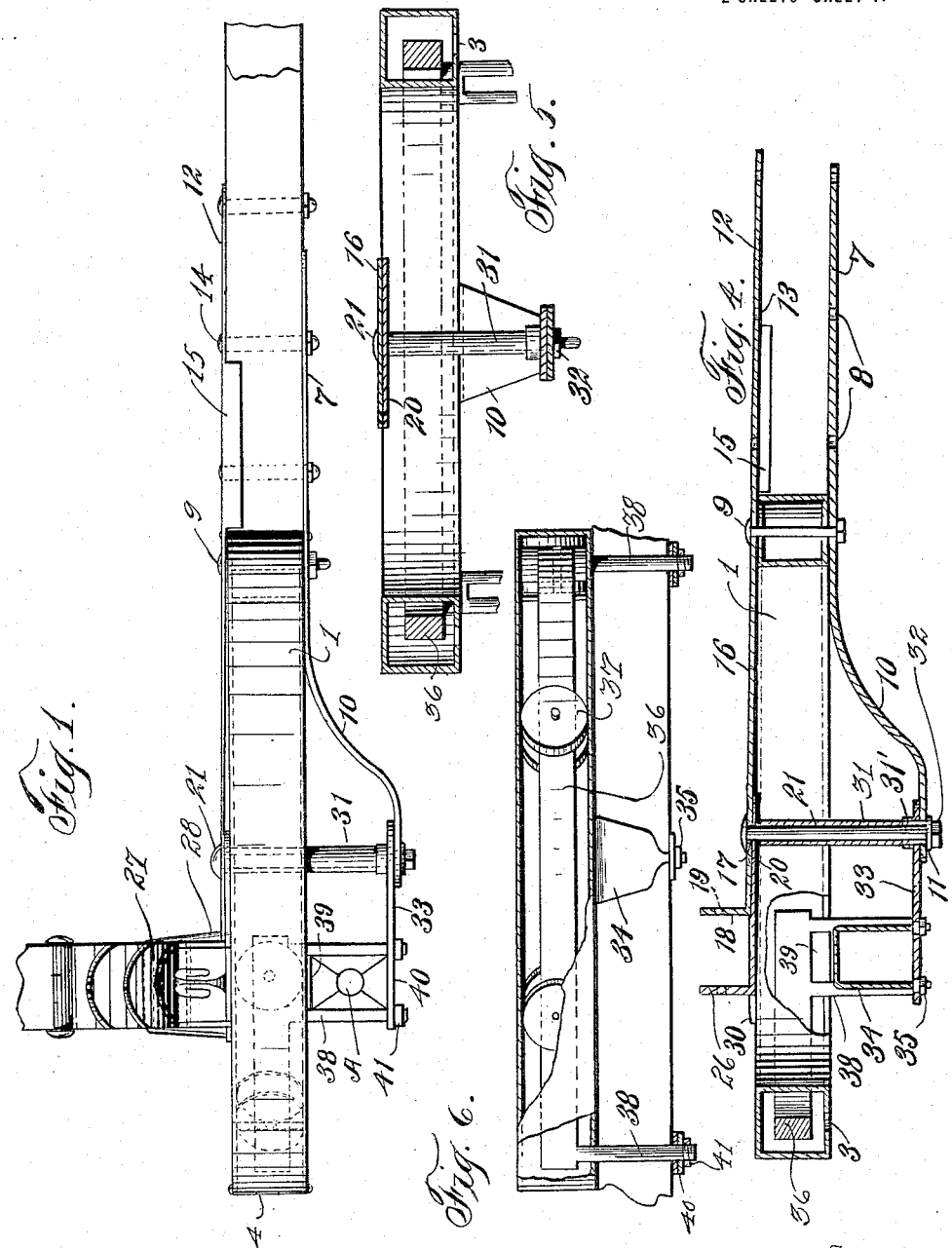

UNITED STATES PATENT OFFICE.

KELLER SMITH, OF ALDRICH, MISSOURI.

FIFTH-WHEEL CONSTRUCTION.

1,168,756.   Specification of Letters Patent.   Patented Jan. 18, 1916.

Application filed August 3, 1914. Serial No. 854,803.

*To all whom it may concern:*

Be it known that I, KELLER SMITH, a citizen of the United States, residing at Aldrich, in the county of Polk, State of Missouri, have invented certain new and useful Improvements in Fifth-Wheel Construction; and I do hereby declare the following to be a full, clear, and exact description of the invention, such as will enable others skilled in the art to which it appertains to make and use the same.

This invention relates to a fifth wheel construction.

An object of the invention is to provide a device of this character which will greatly facilitate the turning of the front axle of a vehicle.

A further object of the invention is to provide a device whereby the front axle will be mounted upon anti-friction rollers in such a manner that the turning of the front axle will be accomplished with the amount of friction greatly reduced.

With these and other objects in view, such as will appear as the description progresses, my invention comprises the combination and arrangement of parts as herein set forth and subsequently claimed.

Referring to the drawing; Figure 1 is a side elevation of my device, with the axle and reach in place thereon. Fig. 2 is a upper plan view of the device. Fig. 3 is a bottom plan view thereof, with a part broken away to expose the anti-friction rollers. Fig. 4 is a section on line 4—4 of Fig. 2. Fig. 5 is a section on line 5—5 of Fig. 2. Fig. 6 is a fragmental front view with parts broken away to show the coöperation of the anti-friction rollers and the track on which they operate.

Referring to the drawing by reference characters, wherein like parts are indicated by like characters throughout the several views: My device comprises a wheel member 1 which is adapted to be placed on a vehicle in a horizontal plane between the axle and the spring support. This wheel member is of a general U-shape in cross section and has on its lower edges inwardly extending flanges 2 forming a slot 3 therein around the inner lower surface of the wheel. This wheel member is composed of two semicircular sections which are hinged together, at 4, and detachably secured at their free ends by interengaging ears 5 which coöperate with a pin 6 to secure the said sections together.

It is to be understood that the wheel member 1 is made in two sections so that if it should become necessary to replace the rollers or in fact any of the movable parts within the said wheel member that the free ends of the said wheel may be disengaged and the sections swung about their pivots so that the movable parts may be readily removed and replaced.

Mounted on the rear side of the wheel 1 and on the under face thereof is a pair of rearwardly extending arms 7 having apertures 8 therein which arms are secured to the said wheel member 1 by bolts 9 which extend through the said wheel member and project outwardly through the slot 3.

Formed integrally with these members 7 is a forwardly extending arm 10 which is inclined downwardly to a point adjacent the center of the said wheel at which place it is bent so as to lie in a horizontal plane. At the end of this member 10 concentric with the center of the wheel 1 is an aperture 11, the purpose of which will hereinafter appear.

Secured to the upper face of the wheel 1 by the bolts 9 is a pair of rearwardly extending arms 12 which are parallel and spaced from the arms 7 and have apertures 13 therein registering with the apertures in the arms 7. The members of a reach are secured between these arms and held in place by bolts 14 passing through the registering apertures 8 and 13. In order that the reach members may not have a tendency to move laterally the uppermost arms 12 are provided with downwardly extending flanges 15 which engage the sides of the reach members.

Formed integrally with the arms 12 and extending forwardly therefrom is a projection 16 which has an aperture 17 formed therein which registers with the aperture 11 in the projection 10. This projection 16 is carried beyond the center of the circle and is bent upwardly at its end to form a flange 18 having holes 19 therein.

Extending transversely of the member 1 and secured to the upper face thereof by bolts 24 is a bar 23 which is provided with an extension 20. This extension 20 projects beneath the projection 16 and has a hole therein. A king pin 21 extends through the aperture 11 in the projection 16 and through the hole in the extension 20 and thence downwardly through the aperture 17 in the projection 10. A flange 26 is formed on this bar 23 and is arranged parallel to the flange 18. The spring 27 is located on the bar 23 and secured between the flanges 18 and 26 by bolts passing through the apertures in the said flanges. The ends of this spring 27 are secured to the bar 23 by U-bolts 28 which pass through apertures 29 in the ears 30 which ears are formed on the said bar 23 at opposite sides of the flanges 18 and 26.

The king pin 21 which extends downwardly through the projection 16 and the projection 10 has a sleeve 31 encircling the same which bears against the under face of the extension 20 and the upper face of the projection 10 and maintains the same in their spaced relationship. The said projections are held into contact with the ends of this sleeve 31 by a nut 32 on the lower end of said king pin.

Pivotally supported on the king pin 21 is a plate 33 having a pair of spaced holes in the ends thereof in which is detachably mounted a U-shaped clip 34 having shanks projecting through the said apertures and held therein by nuts 35. The front axle A of the vehicle extends through this U-shaped clip and is secured therein so that the said axle may have pivotal movement about the king pin 21. The plate 33 is held in position on the sleeve 31 by a collar 31'. In order to prevent the said axle from wabbling and to maintain it in a horizontal position, I have mounted in the wheel 1 between the legs of the U-shaped portion thereof an arcuate rod 36 which is rectangular in cross-section and slidable between the said legs of the said U-shaped member. In order that the friction between the wheel 1 and the said arcuate member may be reduced I have provided a series of rollers 37 which are secured to the ends of the said arcuate member at the opposite sides thereof and at a plurality of points between the ends of the said member. These wheels are of greater diameter than the width of the arcuate member and are in fact of a diameter equal to the distance between the flanges 2 and the upper face of the wheel member so that they will bear upon the flange members at the lower side of the wheel 1 and against the inner face of the upper portion of the said wheel. When the arcuate rod 36 is slid within the wheel 1 the said rollers bear upon the respective parts of the said wheel and facilitate the movement of the said axle. Formed on the ends of the said arcuate rod and extending downwardly through the slot 3 are two pairs of spaced rods 38 which have webs 39 mounted between the members of the said pairs within the slots 3 and which webs extend downwardly out of the said slot below the lower face of the flanges 2. The front axle of the vehicle extends through the U-shaped clip 34 and extends between the members of the pairs of rods 38 and rests upon the webs 39 so that it will not frictionally engage the outer surfaces of the flanges 2. The axle is held in place between the said rods 38 by plates 40 on the ends of the said rods which plates are held in place thereon by nuts 41.

It is of course understood that the tongue of the vehicle is secured in the usual manner to the front axle.

It may be seen from the above construction that when the device is in place upon the vehicle or front spring, the wheel member 1 and the reach members will be as one rigid structure wheel and the front axle of the vehicle will be attached by the U-shaped clip 34 and the rods to the said wheel 1 in such manner that the said axle will be allowed to rotate about the king pin 21 as a pivot.

It may be readily seen that I have provided a device in which the friction between the moving parts of the vehicle will be greatly reduced, and I have further provided means which will maintain the axle in operative relation during the operation of the device in such manner that it will be impossible for the same to frictionally bear upon any of the stationary parts to hinder the reach rotation of the said axle.

I do not wish to be limited to the particular construction of my invention shown, for it is obvious that numerous changes may be made within the spirit of the invention without departing from the scope of the claims.

What is claimed is:—

1. In a device of the class described, a wheel comprising two sections detachably secured together, said wheel being of inverted U-shape formation, inwardly extending flanges on the legs of the U-shaped wheel, an arcuate rod mounted between the legs of the said wheel, roller bearings on the said rod, adapted to bear upon the upper portion of the U-shaped wheel and against the flanges to facilitate the movement of said arcuate rod within the wheel, means to secure the axle to the ends of said rods, and means to space the axles from the flanges, a transverse bar secured to the upper face of the wheel, a spring support secured to said transverse bar, means to attach the reach rigidly to the said wheel, projections extending from said means, a king pin connecting said projections, a U-shaped clip pivotally supported on said king pin and arranged to encircle the axle between the flanges of connection of the axle to the arcuate member.

2. In a device of the class described, a wheel of hollow formation, an arcuate rod slidably mounted within the wheel, a slot formed in the under face of said wheel, bolts extending from the ends of said arcuate rod arranged to attach an axle thereto, roller bearings mounted on the said arcuate rod and adapted to bear on the lower portion of the wheel to facilitate the sliding movement of the arcuate member therein, means to connect a reach rigidly to said wheel, projections on said last mentioned means and a king pin extending therebetween, and means pivotally connected to said king pin for attachment to the axle of the vehicle.

3. In a device of the class described, a hollow wheel member, outwardly extending arms secured to the rear portion of said wheel, projections on said arms extending within the periphery of the wheel, a king pin extending through said projections, a transverse bar secured to the uppermost of said projections, a flange on said bar, a flange on the adjacent projection, means for attaching a spring support to said flanges, a U-shaped clip rotatably mounted on said king pin and adapted to secure an axle thereto, a rod rotatably mounted within said wheel, means to secure the ends of the axle to said rod, and rollers on said rod to facilitate the movement thereof within the wheel.

In testimony whereof, I affix my signature, in the presence of two witnesses.

KELLER SMITH.

Witnesses:
KYLE KIRBY,
J. M. MILLER.

Copies of this patent may be obtained for five cents each, by addressing the "Commissioner of Patents, Washington, D. C."